United States Patent
Snyder et al.

(10) Patent No.: US 11,988,137 B1
(45) Date of Patent: May 21, 2024

(54) AUXILIARY BOILER SYSTEM FOR STEAM INJECTION CYCLE ENGINE

(71) Applicant: RAYTHEON TECHNOLOGIES CORPORATION, Farmington, CT (US)

(72) Inventors: Jacob C. Snyder, East Haddam, CT (US); Jon Erik Sobanski, Glastonbury, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 18/096,969

(22) Filed: Jan. 13, 2023

(51) Int. Cl.
*F02C 3/30* (2006.01)

(52) U.S. Cl.
CPC .......... *F02C 3/305* (2013.01); *F05D 2220/62* (2013.01); *F05D 2260/211* (2013.01)

(58) Field of Classification Search
CPC ...... F01K 23/103; F01K 23/105; F02C 3/305; F02C 7/1435; F05D 2260/211; F05D 2220/62

See application file for complete search history.

(56) References Cited

U.S. PATENT DOCUMENTS

| | | | |
|---|---|---|---|
| 5,150,567 A | 9/1992 | Farrell | |
| 6,484,508 B2 | 11/2002 | Rocklin et al. | |
| 2004/0083736 A1* | 5/2004 | Linder | F01K 23/103 60/39.182 |
| 2014/0130476 A1* | 5/2014 | Nakamura | F02C 9/28 122/20 A |
| 2015/0159518 A1* | 6/2015 | Baramov | F01K 27/02 60/645 |
| 2016/0376909 A1* | 12/2016 | Kulkarni | F02C 7/18 60/39.182 |
| 2023/0145545 A1* | 5/2023 | Löytty | F01K 23/10 29/888.021 |

* cited by examiner

*Primary Examiner* — David P. Olynick
(74) *Attorney, Agent, or Firm* — Carlson, Gaskey & Olds, P.C.

(57) ABSTRACT

A steam injected turbine engine includes a core engine section that generates a first gas flow, a burner where an inlet flow is mixed with fuel and ignited to generate thermal energy, and an evaporator where thermal energy from at least the first gas flow is used to transform water into a first steam flow. The first steam flow is injected into a core flow through the core engine.

18 Claims, 3 Drawing Sheets

US 11,988,137 B1

AUXILIARY BOILER SYSTEM FOR STEAM INJECTION CYCLE ENGINE

BACKGROUND

A turbine engine generates a high energy exhaust gas flow with a mixture of fuel and compressed air. The high energy exhaust gas flow is expanded through a turbine section coupled to a compressor section. Additional gas flow can be generated by injecting steam into the core flow. Steam is generated with heat from the high energy exhaust gas flow. However, the amount of heat available in the high energy exhaust gas flow is limited and therefore limits the amount of steam available.

Turbine engine manufacturers continue to seek improvements to engine performance including improvements to thermal, transfer and propulsive efficiencies.

SUMMARY

A steam injected turbine engine according to an exemplary embodiment of this disclosure, among other possible things includes a core engine section that generates a first gas flow, a burner where an inlet flow is mixed with fuel and ignited to generate additional thermal energy in response to a determination of a predefined operating condition that utilizes additional thermal energy, and an evaporator where thermal energy from at least the first gas flow is used to transform water into a first steam flow. The first steam flow is injected into a core flow through the core engine.

In a further embodiment of the foregoing, the inlet flow to the burner includes the first gas flow and the burner is selectively operable to add thermal energy to the first gas flow.

In a further embodiment of any of the foregoing, the burner is disposed aft of the core engine and forward of the evaporator.

In a further embodiment of any of the foregoing, the steam injected turbine engine further includes a condenser where water is recovered from the first gas flow and communicated to the evaporator.

In a further embodiment of any of the foregoing, the burner is disposed outside of a core flow path and a second evaporator is in communication with thermal energy generated by the burner for generating a second steam flow.

In a further embodiment of any of the foregoing, the second evaporator is disposed outside of the core flow path.

In a further embodiment of any of the foregoing, the inlet flow to the burner includes inlet air that bypasses the core engine.

In a further embodiment of any of the foregoing, the second steam flow is combined with a first steam flow prior to injection into the core flow in the core engine.

In a further embodiment of any of the foregoing, the core engine includes a compressor section where inlet air is compressed and communicated to a combustor where the compressed air is mixed with fuel and ignited to generate the first gas flow.

In a further embodiment of any of the foregoing, the first steam flow is injected into the core flow at the combustor.

A steam injected turbine engine according to an exemplary embodiment of this disclosure, among other possible things includes a propulsor section, a core engine that includes a compressor section where inlet air is compressed and communicated to a combustor where the compressed air is mixed with fuel and ignited to generate a first gas flow, a burner where an inlet flow is mixed with fuel and ignited to generate thermal energy, and a first evaporator where thermal energy from at least the first gas flow is used to transform water into a first steam flow. The first steam flow is injected into a core flow through the core engine.

In a further embodiment of the foregoing, the first gas flow is communicated to the burner as the inlet flow, mixed with fuel and ignited to increase thermal energy of the first gas flow that is communicated to the first evaporator.

In a further embodiment of any of the foregoing, the burner is selectively activated to add thermal energy under conditions where thermal energy from the first gas flow alone is not sufficient to generate a desired characteristic of the first steam flow.

In a further embodiment of any of the foregoing, the burner is disposed outside of the core engine flow. The inlet flow includes inlet airflow that bypasses the core engine and a second evaporator that generates a second steam flow with thermal energy that is provided by the burner.

In a further embodiment of any of the foregoing, the second steam flow is combined with the first steam flow prior to injection into the core flow.

In a further embodiment of any of the foregoing, the burner and the second evaporator are selectively activated to generate the second steam flow to supplement the first steam flow.

In a further embodiment of any of the foregoing, the steam injected turbine engine further includes a condenser where water is recaptured from at least the first gas flow and communicated to at least the first evaporator.

A method of operating a steam injected turbine engine according to an exemplary embodiment of this disclosure, among other possible things includes generating a first gas flow in a combustor by igniting a mixture of compressed inlet air and fuel, transforming a water flow into a first steam flow in a first evaporator with thermal energy from the first gas flow, injecting the first steam flow into a core flow, determining an operating condition requiring additional steam flow; and selectively generating additional thermal energy in a burner to supplement thermal energy input into the first gas flow responsive to a determined operating condition requiring additional steam flow.

In a further embodiment of the foregoing, the burner inputs the supplemental thermal energy into the first gas flow to increase a capacity of the first evaporator for transforming water into the first steam flow.

In a further embodiment of any of the foregoing, the burner communicates thermal energy to a second evaporator for generating as second steam flow to supplement the first steam flow.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
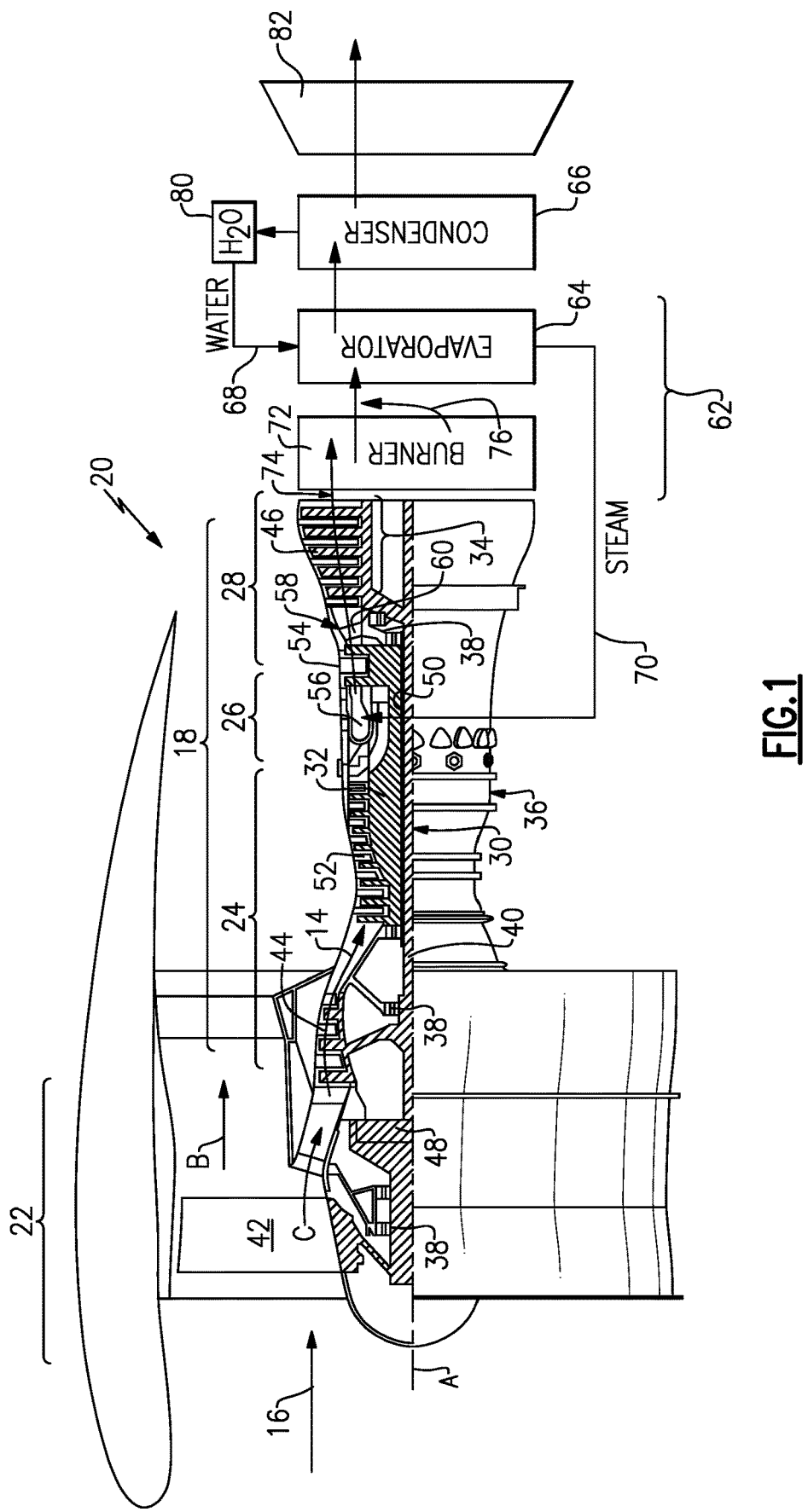
FIG. 1 is a schematic view of an example steam injected turbine engine.

FIG. 1 schematically illustrates a steam injected turbine engine 20 with an auxiliary boiler system 62 for selectively increasing steam generation capacity. Thermal energy from an exhaust gas flow 74 is used transform water into a steam flow 70. The steam flow 70 is injected into a core engine 18 to increase mass flow and thereby thrust. The injected steam flow 70 increases the amount of work that can be produced without increasing the amount of fuel utilized to generate the exhaust gas flow 74.

Thermal energy from the exhaust gas flow 74 is limited and therefore limits the amount of steam that may be generated and injected into the core engine 18. A burner 72 of the boiler system 62 is selectively actuatable to generate additional thermal energy and provide for additional steam generation.

The engine 20 includes a propulsor section 22, a compressor section 24, a combustor section 26 and the turbine section 28. The propulsor section 22 drives inlet airflow 16 along a bypass flow path B, while the compressor section 24 draws air in along a core flow path C where a core flow 14 is compressed and communicated to a combustor section 26. In the combustor section 26, compressed air is mixed with fuel and ignited to generate the high energy combusted exhaust gas flow 74 that expands through the turbine section 28 where energy is extracted and utilized to drive the propulsor section 22 and the compressor section 24.

Although the disclosed non-limiting embodiment depicts a two-spool turbofan turbine engine, it should be understood that the concepts described herein are not limited to use with two-spool turbofans as the teachings may be applied to other types of turbine engines. For example, a turbine engine including a three-spool architecture in which three spools concentrically rotate about a common axis and where a low spool enables a low-pressure turbine to drive a fan via a gearbox, an intermediate spool that enables an intermediate pressure turbine to drive a first compressor of the compressor section, and a high spool that enables a high-pressure turbine to drive a high-pressure compressor of the compressor section. Additionally, non-concentric engine architectures with offset and/or decoupled cores could also be utilized and are within the scope and contemplation of this disclosure. Additionally, the features of this disclosure may be applied to other engine configurations utilized to generate shaft power.

The example engine 20 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided.

The low-speed spool 30 generally includes an inner shaft 40 that connects a fan 42 and a low-pressure (or first) compressor section 44 to a low-pressure (or first) turbine section 46. The inner shaft 40 drives the propulsor section 22 through a speed change device, such as a geared architecture 48, to drive the propulsor section 22 at a lower speed than the low-speed spool 30. The high-speed spool 32 includes an outer shaft 50 that interconnects a high-pressure (or second) compressor section 52 and a high-pressure (or second) turbine section 54. The inner shaft 40 and the outer shaft 50 are concentric and rotate via the bearing systems 38 about the engine central longitudinal axis A. Though illustrated as the inner shaft 40 and the outer shaft 50 being concentric with the fan 42, this is not intended to be so limiting, and in other examples, the inner shaft 40 and the outer shaft 50 may be configured concentrically about a first longitudinal axis and the fan 42 may be configured to rotate about a second longitudinal axis that is different from the first longitudinal axis. Moreover, other engine architectures with offset core components and sections are within the contemplation and consideration of this disclosure.

A combustor 56 is arranged between the high-pressure compressor 52 and the high-pressure turbine 54. In one example, the high-pressure turbine 54 includes at least two stages to provide a double stage high-pressure turbine 54. In another example, the high-pressure turbine 54 includes only a single stage. As used herein, a "high-pressure" compressor or turbine experiences a higher pressure than a corresponding "low-pressure" compressor or turbine.

The example low-pressure turbine 46 has a pressure ratio that is greater than about 5. The pressure ratio of the example low-pressure turbine 46 is measured prior to an inlet of the low-pressure turbine 46 as related to the pressure measured at the outlet of the low-pressure turbine 46 prior to an exhaust nozzle.

A mid-turbine frame 58 of the engine static structure 36 is arranged generally between the high-pressure turbine 54 and the low-pressure turbine 46. The mid-turbine frame 58 further supports bearing systems 38 in the turbine section 28 as well as setting airflow entering the low-pressure turbine 46.

The core flow 78 through the core airflow path C is compressed by the low-pressure compressor 44 then by the high-pressure compressor 52, after which it is mixed with fuel and ignited in the combustor 56 to produce the high energy hot combusted gas flow 74 that is expanded through the high-pressure turbine 54 and low-pressure turbine 46. The mid-turbine frame 58 includes vanes 60, which are in the core airflow path and function as an inlet guide vane for the low-pressure turbine 46. Utilizing the vane 60 of the mid-turbine frame 58 as the inlet guide vane for low-pressure turbine 46 decreases the length of the low-pressure turbine 46 without increasing the axial length of the mid-turbine frame 58. Reducing or eliminating the number of vanes in the low-pressure turbine 46 shortens the axial length of the turbine section 28. Thus, the compactness of the turbine engine 20 is increased and a higher power density may be achieved.

The disclosed turbine engine 20 in one example is a high-bypass geared aircraft engine. In a further example, the turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the turbine engine 20 includes a bypass ratio greater than about ten (10:1) and the fan diameter is significantly larger than an outer diameter of the low-pressure compressor 44. It should be understood, however, that the above parameters are only exemplary of one embodiment of a turbine engine including a geared architecture and that the present disclosure is applicable to other turbine engines.

A significant amount of thrust is provided by the bypass flow B due to the high bypass ratio. The propulsor section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram\ °\ R)/(518.7°\ R)]0.5$. The "Low corrected fan tip speed", as disclosed herein according to one non-limiting embodiment, is less than about 1150 ft/second.

The example propulsor section 22 comprises in one non-limiting embodiment less than about 26 fan blades 42. In another non-limiting embodiment, the propulsor section 22 includes less than about 20 fan blades 42. Moreover, in one disclosed embodiment the low-pressure turbine 46 includes no more than about 6 turbine rotors schematically indicated at 34. In another non-limiting example embodiment, the low-pressure turbine 46 includes about 3 turbine rotors. A ratio between the number of fan blades 42 and the number of low-pressure turbine rotors is between about 3.3 and about 8.6. The example low-pressure turbine 46 provides the driving power to rotate the propulsor section 22 and therefore the relationship between the number of turbine rotors 34 in the low-pressure turbine 46 and the number of blades 42 in the propulsor section 22 disclose an example turbine engine 20 with increased power transfer efficiency.

The example boiler system 62 includes the evaporator 64 and burner 72 disposed aft of the turbine section 28 along the engine longitudinal axis A. The burner 72 may be integrated into the static engine structure, such as within turbine exhaust case struts or other static engine structures. A condenser 66 aft of the evaporator 64 and forward of a nozzle 82 recovers water from the exhaust gas flow 74 for conversion into steam in the evaporator 64. Water recovered from the exhaust gas flow 66 is accumulated in a storage tank 80 and may be pressurized before being vaporized in the evaporator 64 and injected as a steam flow 70 into the core engine 18. In one disclosed example embodiment, the steam flow 70 is injected into the combustor 56. However, the steam flow 70 may be injected into other locations within the core engine 18 to increase mass flow and engine efficiency within the scope and contemplation of this disclosure.

Figure 2:
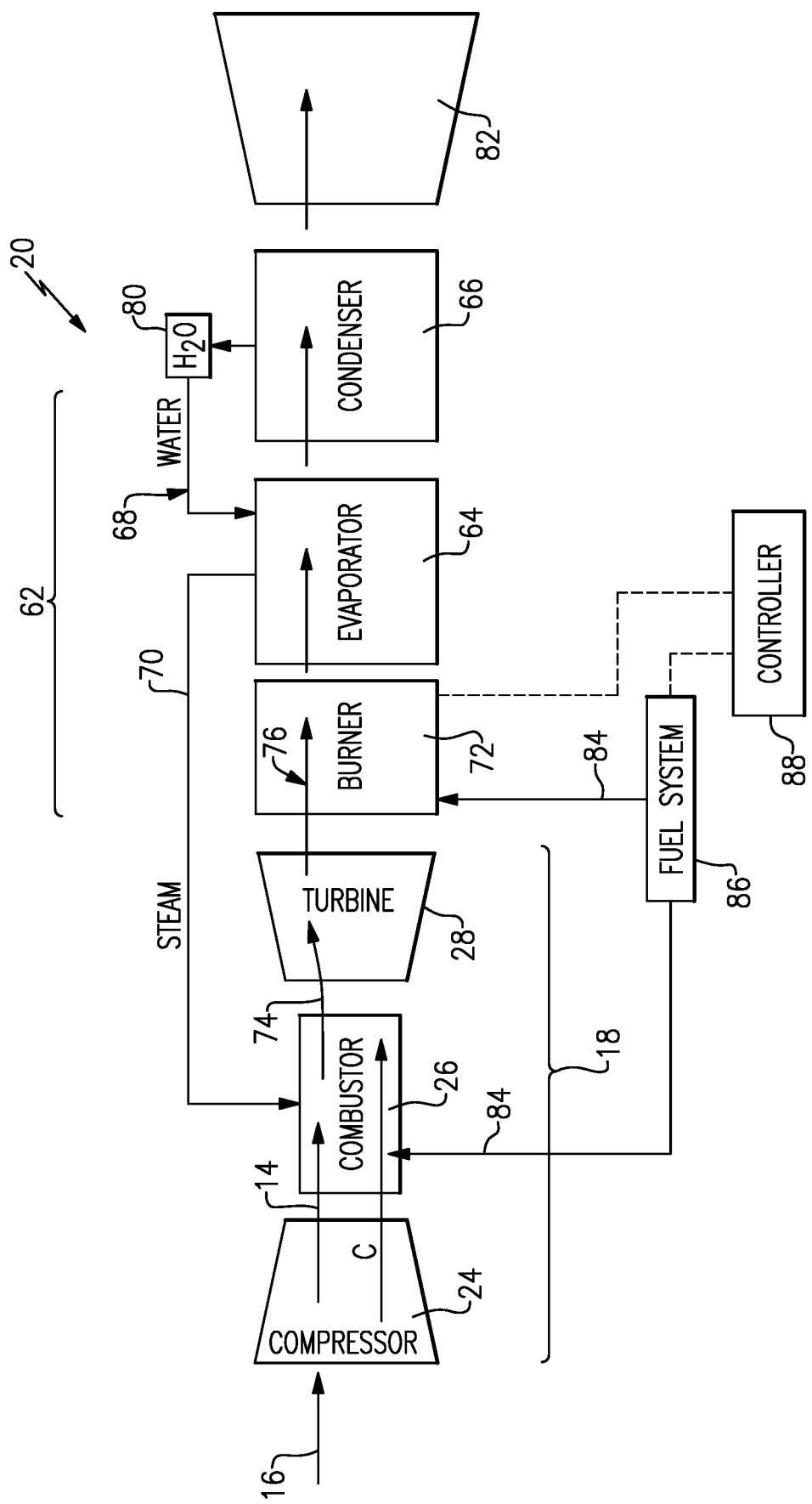
FIG. 2 is a schematic view of the example steam injected turbine engine of FIG. 1.

Referring to FIG. 2 with continued reference to FIG. 1, a simplified schematic view of an example boiler system 62 includes the burner 72 that receives fuel 84 from a fuel system 86. A controller 88 is programmed to selectively control operation of the burner 72 to add thermal energy, schematically indicated by arrow 76, into the gas flow 74 from the combustor 26. In one disclosed embodiment, the controller 88 governs actuation of the burner 72 by controlling the flow of fuel 84. The burner 72 may be activated based on current engine operating conditions. For example, the controller 88 may actuate the burner 72 to generate additional thermal energy based on an engine power setting, internal temperatures and/or pressures, ambient temperature and/or pressure, altitude of an aircraft associated with the engine 20. Moreover, the controller 88 may activate the burner 72 according to a predefined engine operating profile such as for example, take off, climb, power control lever above a threshold position as well as any other engine operating condition included in an engine operating profile. Moreover, actuation of the burner 72 to reheat the exhaust gas flow 74 may be prompted by other engine operating criteria, such as for example, ambient conditions, aircraft operating conditions or any other aircraft or engine condition that may benefit from additional energy.

The burner 72 receives the gas flow 74 after it has expanded and cooled through the turbine section 28. The thermal energy remaining in the gas flow 74 after the turbine section 28 may be sufficient to generate a desired amount of steam flow 70 for most engine operating conditions. In such operating conditions, the burner 72 is not activated and the gas flow 74 is communicated to the evaporator 64 in the same condition as it is exhausted from the turbine section 28.

During engine operation when additional steam flow 70 is desired and the thermal energy from the exhaust gas flow 74 directly from the turbine section is not sufficient, the burner 72 is activated. Fuel 84 is mixed with the exhaust gas flow 74 and ignited to provide addition thermal energy into the gas flow 74. The added thermal energy increases the capacity of the evaporator 64 to generate steam without changing the configuration of the evaporator 64. The gas flow 74 with the burner 72 activated is hotter and thereby provides for the transformation of increased amounts of steam. The burner 72 may be deactivated once the demand for steam flow is reduced.

In this disclosed embodiment, the burner 72 and evaporator 64 are schematically shown separately along the engine longitudinal axis A and within the core flow path C. The burner 72 and evaporator 64 may be configured as a common device and may be arranged outside of the core flow path C. Moreover, in this disclosed example, all of the gas flow 74 is routed through the burner 72 and the evaporator 64. However, the burner 72 and evaporator 64 may be arranged such that a portion of the gas flow 74 bypasses these devices.

Figure 3:
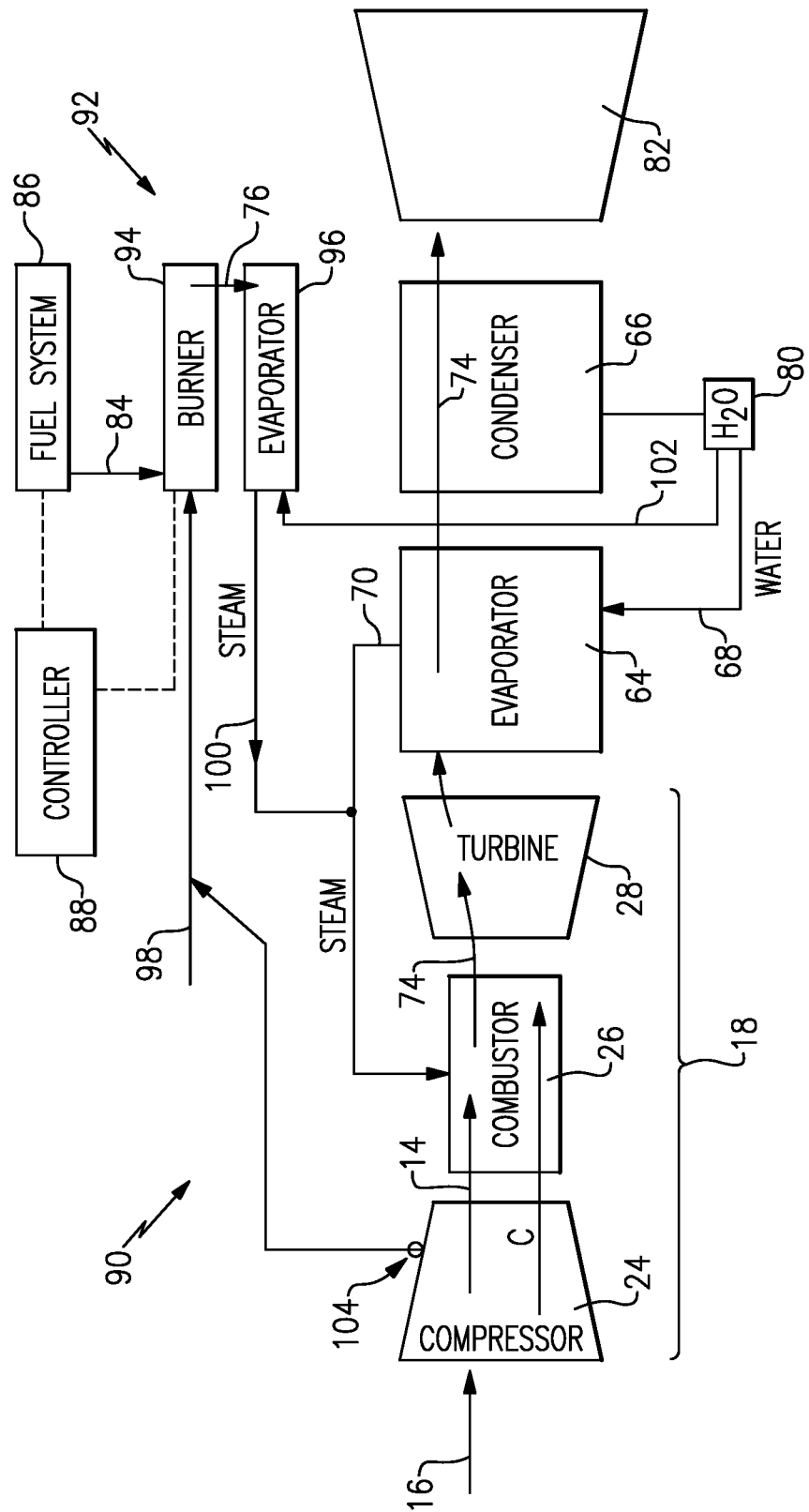
FIG. 3 is a schematic view of another example steam injected turbine engine.

Referring to FIG. 3, another steam injected turbine engine configuration is schematically shown and indicated at 90. The engine 90 includes a boiler system 92 that is disposed outside of the gas flow path between the turbine section 28 and the nozzle 82. Accordingly, the example boiler system 92 is disposed outside of the engine longitudinal axis A.

The burner 94 receives fuel 84 from the fuel system 86 and is controlled by a controller 88. The controller 88 is programmed to selectively operate the burner 94 to supplement the amount of steam that is injected into the core engine 18. In this disclosed embodiment, the gas flow 74 remains the same and is not altered nor reheated.

The boiler system 92 includes a second evaporator 96 that uses heat generated in the burner 94 to generate a second steam flow 100. A second water flow 102 is provided from a water source, such as the example condenser 66 and/or water storage tank 80. A second steam flow 100 is generated and combined with the steam flow 70 generated in the evaporator 66.

The burner 94 operates outside of the path of the gas flow 74 and therefore may use another source of airflow to support combustion. In this disclosed embodiment, a portion of a bypass airflow indicated at 98 is communicated to the burner 94. The bypass airflow 98 is routed outside of the core engine 18 and directly to the burner 94. The direct routing of airflow 98 provides fresh oxygenated airflow that has not already been through a combustion cycle.

Although the example airflow 98 is disclosed as bypassing the core engine 18, the airflow 98 could be bleed from a location 104 within the core engine 18. Moreover, oxygen to facilitate combustion could be provided from other systems. In one disclosed example, the location 104 is from within the compressor section 24 to provide air at a pressure corresponding to a desired operation of the burner 94. Although airflow 98 is shown by example as being drawn from the compressor section 24 and/or from a bypass flow, other sources of air to facilitate combustion in the burner 94 could be utilized and are within the contemplation of this disclosure.

The disclosed example steam injected engine embodiments include the selectively operable boiler system for supplementing the capacity for generating steam flow within existing thermal production limits.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A steam injected turbine engine comprising:
    a core engine including a compressor section where an inlet airflow is compressed and communicated to a combustor section where the inlet airflow is mixed with fuel and ignited to generate a first gas flow that is expanded through a turbine section, the core engine having a core flow that extends from an inlet that receives the inlet airflow and through the compressor section, the combustor section and the turbine section;
    a burner where a portion of the inlet flow is mixed with fuel and ignited to generate additional thermal energy in response to a determination of a predefined operating condition that utilizes additional thermal energy;
    an evaporator where the thermal energy from at least the first gas flow is used to transform water into a first steam flow, wherein the first steam flow is injected into the core flow through the core engine; and
    a condenser in communication with a cooling flow where water is extracted from first gas flow and communicated to the evaporator for transformation into the first steam flow.

2. The steam injected turbine engine as recited in claim 1, wherein the inlet flow to the burner comprises the first gas flow and the burner is selectively operable to add the additional thermal energy to the first gas flow.

3. The steam injected turbine engine as recited in claim 2, wherein the burner is disposed downstream of the turbine section of the core engine and upstream of the evaporator.

4. The steam injected turbine engine as recited in claim 1, wherein the burner is disposed outside of a core flow path and a second evaporator is in communication with the thermal energy generated by the burner for generating a second steam flow.

5. The steam injected turbine engine as recited in claim 4, wherein the second evaporator is disposed outside of the core flow path.

6. The steam injected turbine engine as recited in claim 4, wherein the inlet flow to the burner comprises inlet air that bypasses the core engine.

7. The steam injected turbine engine as recited in claim 4, wherein the second steam flow is combined with a first steam flow prior to injection into the core flow in the core engine.

8. The steam injected turbine engine as recited in claim 1, wherein the core engine includes a compressor section where inlet air is compressed and communicated to the combustor section where the compressed inlet air is mixed with fuel and ignited to generate the first gas flow.

9. The steam injected turbine engine as recited in claim 8, wherein the first steam flow is injected into the core flow at the combustor section.

10. A steam injected turbine engine comprising:
    a propulsor section;
    a core engine including a compressor section where inlet air is compressed and communicated to a combustor where the compressed air is mixed with fuel and ignited to generate a first gas flow, the core engine having a core flow that extends from an inlet that receives the inlet airflow and through the compressor section, the combustor section and the turbine section;
    a burner where an inlet flow is mixed with fuel and ignited to generate additional thermal energy;
    a first evaporator where thermal energy from at least the first gas flow is used to transform water into a first steam flow, wherein the first steam flow is injected into the core flow through the core engine; and
    a condenser in communication with a cooling flow where water is extracted from first gas flow and communicated to the first evaporator for transformation into the first steam flow.

11. The steam injected turbine engine as recited in claim 10, wherein the first gas flow is communicated to the burner as the inlet flow, mixed with fuel and ignited to increase thermal energy of the first gas flow that is communicated to the first evaporator.

12. The steam injected turbine engine as recited in claim 11, wherein the burner is selectively activated to add the additional thermal energy under conditions where thermal energy from the first gas flow alone is not sufficient to generate a desired characteristic of the first steam flow.

13. The steam injected engine as recited in claim 10, wherein the burner is disposed outside of the core engine flow, the inlet flow comprises inlet airflow that bypasses the core engine and a second evaporator generates a second steam flow with the additional thermal energy provided by the burner.

14. The steam injected engine as recited in claim 13, wherein the second steam flow is combined with the first steam flow prior to injection into the core flow.

15. The steam injected engine as recited in claim 13, wherein the burner and the second evaporator are selectively activated to generate the second steam flow to supplement the first steam flow.

16. A method of operating a steam injected turbine engine comprising:
    providing the steam injected turbine engine comprising a core engine including a compressor section where an inlet airflow is compressed and communicated to a combustor section where the inlet airflow is mixed with fuel and ignited to generate a first gas flow that is expanded through a turbine section, the core engine having a core flow that extends from an inlet that receives the inlet airflow and through the compressor section, the combustor section and the turbine section;
    generating the first gas flow in a combustor by igniting a mixture of compressed inlet air and fuel;
    removing water from the first gas flow in a condenser to generate a water flow;
    transforming the water flow into a first steam flow in a first evaporator with thermal energy from the first gas flow;
    injecting the first steam flow into the core flow;
    determining an operating condition requiring additional steam flow; and selectively generating additional thermal energy in a burner to supplement thermal energy input into the first gas flow responsive to a determined operating condition requiring additional steam flow.

17. The method as recited in claim 16, wherein the burner inputs the additional thermal energy into the first gas flow to increase a capacity of the first evaporator for transforming water into the first steam flow.

18. The method as recited in claim 16, wherein the burner communicates the additional thermal energy to a second evaporator for generating as second steam flow to supplement the first steam flow.

\* \* \* \* \*